(12) United States Patent
Fernandez

(10) Patent No.: US 6,763,083 B2
(45) Date of Patent: Jul. 13, 2004

(54) ARTICLE SCREENING SYSTEM

(75) Inventor: Kenneth R. Fernandez, Hampton Cove, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 151 days.

(21) Appl. No.: 10/232,937

(22) Filed: Aug. 30, 2002

(65) Prior Publication Data

US 2004/0062346 A1 Apr. 1, 2004

(51) Int. Cl.[7] .............................................. G01N 23/04
(52) U.S. Cl. ......................... 378/41; 378/57; 378/196; 378/205
(58) Field of Search ............................ 378/41, 53, 54, 378/55, 57, 58, 196, 197, 205

(56) References Cited

U.S. PATENT DOCUMENTS

| | | | |
|---|---|---|---|
| 5,247,561 A | 9/1993 | Kotowski | |
| 5,463,667 A | * 10/1995 | Ichinose et al. | ............... 378/58 |
| 5,692,029 A | 11/1997 | Husseiny et al. | |
| 5,796,802 A | 8/1998 | Gordon | |
| 5,912,942 A | 6/1999 | Schick et al. | |
| 5,943,388 A | 8/1999 | Tumer | |
| 6,044,353 A | 3/2000 | Pulgliese, III | |
| 6,069,936 A | 5/2000 | Bjorkholm | |
| 6,088,423 A | 7/2000 | Krug et al. | |
| 6,115,449 A | * 9/2000 | Jang et al. | ..................... 378/41 |
| 6,256,372 B1 | * 7/2001 | Aufrichtig et al. | ............ 378/41 |
| 6,256,404 B1 | 7/2001 | Gordon et al. | |
| 6,304,629 B1 | 10/2001 | Conway et al. | |
| 6,359,961 B1 | 3/2002 | Aufrichtig et al. | |
| 6,370,223 B1 | * 4/2002 | Gleason et al. | ............... 378/58 |
| 6,449,333 B1 | * 9/2002 | Yamasaki | .................... 378/42 |
| 6,618,464 B2 | * 9/2003 | Mizobuchi et al. | ........... 378/55 |

* cited by examiner

*Primary Examiner*—Edward J. Glick
*Assistant Examiner*—Allen C. Ho
(74) *Attorney, Agent, or Firm*—James J. McGroary; Norman L. Wilson, Jr.

(57) ABSTRACT

During the last ten years patents directed to luggage scanning apparatus began to appear in the patent art. Absent from the variety of approaches in the art is stereoscopic imaging that entails exposing two or more images of the same object, each taken from a slightly different perspective. If the perspectives are too different, that is, if there is too much separation of the X-ray exposures, the image will look flat. Yet with a slight separation, a stereo separation, interference occurs. Herein a system is provided for the production of stereo pairs. One perspective, a left or a right perspective angle, is first established. Next, the other perspective angle is computed. Using these left and right perspectives the X-ray sources can then be spaced away from each other.

6 Claims, 3 Drawing Sheets

ARTICLE SCREENING SYSTEM

CROSS-REFERENCES TO RELATED APPLICATIONS

There are no applications related to this application.

STATEMENT REGARDING FEDERALLY-SPONSORED RESEARCH OR DEVELOPMENT

The invention described in this patent was made by an employee of the United States Government and may be manufactured and used by or for the Government for governmental purposes without the payment of any royalties.

FIELD OF THE INVENTION

This invention relates to screening apparatus particularly suited for screening articles or objects such as assembly line parts and baggage.

BACKGROUND OF THE INVENTION

Considering first the baggage aspect, during the last ten years patents directed to luggage inspecting apparatus began to appear in the patent art. Recently there has been a significant increase in patents relating to luggage scanning, each with a different approach. Illustrating these approaches, the invention that is the subject of U.S. Pat. No. 5,247,561 is based on Compton scattering. Compton scattering is proportional to mass density. Energy such as X-rays applied to luggage containers is measured, and a three-dimensional image of the objects in the container is constructed. In U.S. Pat. No. 6,304,629 a conveyor belt passes through an isolating tunnel which is a substantially enclosed area of the tunnel that is sealed-off by curtains so that no X-rays will leak out. The X-ray baggage system disclosed in U.S. Pat. No. 6,088,423 uses three parallel stationary beams of X-rays in an enclosed tunnel. The parallel rays are spaced from each other in the tunnel along the direction in which baggage moves through the tunnel. The three fan beams produce sets of scan lines from which X-ray attenuation data are measured. The background section of that patent refers to various patents such as U.S. Pat. No. 5,796,802, U.S. Pat. No. 6,256,404, and U.S. Pat. No. 943,388 directed to tomographically produced X-ray images. Computed X-ray tomography is a technique which has been in use in medical applications for more than 20 years. In U.S. Pat. No. 5,796,802, in order to save additional time required in computed tomography, the data are first only partially analyzed. From this pre-selected, pre-screened, data it is determined whether a physical attribute of interest is present. In U.S. Pat. No. 5,943,388 a plurality of X-ray detectors, each having an output which includes at least two threshold data levels, are utilized. Display means responsive to the plurality of X-ray detectors produce tomographic images for different energy bands. In the computed tomography system of U.S. Pat. No. 6,256,404 the computed tomography machine scans the field of view to generate scan data. Using the size and location of the scanned object two portions of pixels in the field of view are identified. Only pixels that provide information related to the scanned object, the first portion of pixels, are processed during image reconstruction.

A study of the different detection technologies in use today reveals that although the use of a linear detector array allows a high inspection speed, its output signal does not provide sufficiently detailed information. A coherent X-ray scatter spectra analysis enables a better detection and much lower false alarm rate (<1%), but it is more time consuming, leading to a lower throughput. Dual energy detection systems base their decision on an estimation of the density of objects in a bag or other container. This is done by a combined evaluation of two different X-ray images generated at two different X-ray voltages (e.g. 150 kV and 75 kV). The approach involves dedicated image processing to separate different objects superimposed on one another in the projected image. The measured densities are compared with library values of densities of known explosives. This multi-view technique uses two X-ray systems with two different views (bottom view, top view). The estimated material density values generated from the two-projection image pixel data are compared with the typical density data for identifying image objects.

It can be seen that the prior art illustrates the conclusion reached in U.S. Pat. No. 6,088,423 that existing baggage inspection systems meet some but not all of the inspection needs. Thus, three dimensional technologies are utilized but only as tomographic and dual energy techniques. Absent from the variety of approaches discussed is stereoscopic imaging technology. Rather than relying on shades or textures to discover the shape of an object, a more effective way would be to use two or more images of the same object each taken from a slightly different perspective or viewpoint. If there is too much separation or deviation of the X-ray tubes the image will look flat., or the result may be a depth perception which is exaggerated or reduced. Indeed, the stereo pairs may not fuse at all, with the viewer seeing two separate images. Yet with a slight separation interference occurs, possibly explaining why stereoscopic systems have not been employed.

SUMMARY OF THE INVENTION

Stereo pairs create three dimensional images when binocular disparity cues are correct. Binocular disparity depends primarily on both the distance of the X-ray source to the projection plane or target, and the separation of the right and left X-ray devices or tubes. In the case of X-ray scanning, when the binocular disparity is within correct limits, the X-rays from the two X-ray tubes converge at the target. This convergence results in cross exposure interference, to be discussed hereinafter in more detail, leading to blurred images. This is an undesirable condition which, as pointed out, may have been the barrier to the stereo pairs approach to object scanning. Rather, when multiple X-ray sources have been used they have been orthogonal beam X-ray systems in which X-ray beams were projected at right angles toward the top and a side of an object.

An object of this invention is to provide a system for scanning articles such as luggage and other objects by the production of stereo pairs. Assuming that the articles are traveling from left to right, this is accomplished by the use of left and right X-ray tubes aligned on a common line in the same plane above the path, and by left and right X-ray sensors disposed below the path to sense X-rays emitted by the tubes. An appropriate, or desired, left viewpoint or perspective angle is first established, determined by the angle formed by the common line and a line to the target. Next, a right perspective angle is computed using the distance from the left X-ray tube to the target, the distance from the left X-ray tube to an imaginary point, and the distance from that imaginary point to the target. The imaginary point is a point which is within the stereoscopic range on the common line between the tubes. The computed or determined right perspective angle, then, is a right viewpoint from a slightly different perspective leading to a stereo pair. Using these left and right perspectives, or perspective angles, the left and right X-ray sources or tubes can then be spaced away from each other an actual distance such that the stereo base is greater than a normal stereo base required for a stereo pair of images. This spacing eliminates cross exposure interference while still obtaining X-ray exposures from two slightly different perspectives. Since the articles are traveling on a conveyor belt, or otherwise, from left to right the two images required for stereoscopic vision will have been sensed in sequence, although they are out of order. To this end a sensor is used to determine luggage belt positions further enabling an estimate of the coordinates of the luggage belt appearing in the center-of-view of the left and right sensors. A processor then separately stores radiographic data for objects appearing within the field-of-view of each sensor along with the belt coordinates of the center-of-view for each sensor, respectively. The processor provides a continuous sequence of stereo images for stereographic display by retrieving left and right radiographic images with similar belt coordinate estimates for transmission to the stereo display device. A human operator upon viewing the stereo radiographic pairs may control the belt motion and display sequence to more closely examine or re-examine items through interaction with the operator control interface panel.

DETAILED DESCRIPTION OF THE INVENTION

Normal stereoscopic vision depends essentially on the fact that each eye sees from a slightly different perspective. The key to producing a stereoscopic display, then, is getting a different perspective to each eye. Parallax is merely the apparent displacement of a viewed point that results from a change in the point of observation or from relocation from one viewing spot to another. The brain uses the differing parallax to determine distances to objects being viewed. This same effect lies at the heart of viewing stereo pairs taken from two lateral positions. When the stereo pair is properly positioned left-to-right and then viewed through a stereoscopic device the eyes send a signal to the brain, which on further processing, creates a perception of depth. It is this perception of depth that must be obtained herein to yield a three dimensional effect.

As indicated previously, the degree of the stereo effect depends on both the distance of the X-ray source to the projection plane or article, and the separation of the left and right X-ray sources. Too large a separation is very difficult to resolve and is known as hyperstereo. It is this separation of left and right X-ray sources which is of concern herein. However, in the case of X-ray devices required for scanning a separation less than the hyperstereo distance is too close. To illustrate this FIG. 1 is given. Referring to that figure, X-ray sources 1 and 2 are illustrated, along with objects 4, on conveyor belt 6. A sensor or detector 7 is disposed within conveyor 6. It can be seen that the rays leading from two properly spaced X-ray sources 1 and 2 cross each other, the result being cross exposure interference producing an undesirable result. For stereo image pairs the images must be constrained not to overlap. By the practice of this invention stereo pairs can be used to obtain three dimensional views of articles being scanned. For a better understanding of how this is accomplished a specific embodiment of the invention will now be described in conjunction with the accompanying drawings.

SPECIFIC EMBODIMENT

Figure 1:
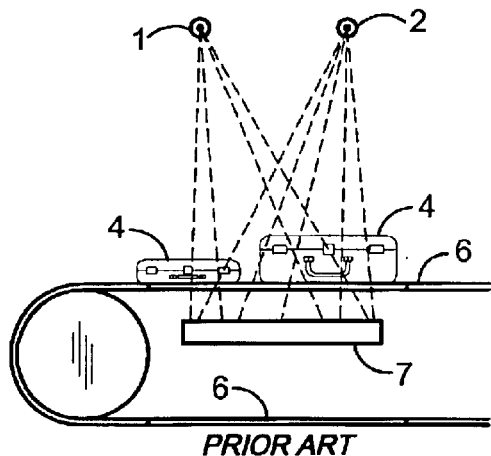
FIG. 1 is a diagrammatic exemplification of cross exposure interference.
Figure 2:
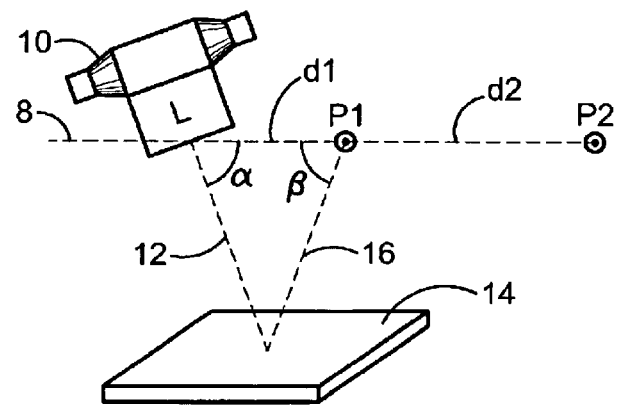
FIG. 2 is a diagrammatic representation showing how the left and right perspective angles are derived.

It has been previously explained that 3-D images require that a stereo pair of images be sensed. In stereo pairs a different perspective to each eye is obtained if the separation of the left and right X-ray sources is less than the standard distance. In general the standard stereoscopic distance, or separation range, for two X-ray sources is one-twentieth to one-fiftieth of the distance from the X-ray source to the projection plane or object. However, when this separation or stereo base is maintained, cross exposure interference results. It has also been noted that the left (L) and right (R) X-ray emitting tubes must be aligned on a common line in the same plane. FIG. 2 illustrates a method by which the right X-ray source can be separated from the left source by more than the stereoscopic distance to avoid the interference. Dashed line 8 represents the common line. The X-ray source is represented as 10 with left tube L emitting X-rays 12 toward target 14 at a predetermined perspective angle α formed by common line 8 and X-ray path 12 to the target. Since the right X-ray tube P2 will not be within the stereo base, an imaginary point P1 spaced on common line 8 a known distance d1 within the stereoscopic range is taken as a reference point. The distance on X-ray path 16 from point P1 to the target 14 is also known. Using the distance d1 to P1, the distance on X-ray path 16 from point P1 to the target 14, and the distance 12 from the target to the left X-ray tube L, a right perspective angle β can be determined. Angles α and β are the necessary viewpoints from slightly different perspectives leading to a stereo pair. Since this angle β is known X-ray tube R can be moved away on common line 8 any desired distance d2 to, say, a point P2, and the scanner can be used without cross exposure interference.

Figure 3:
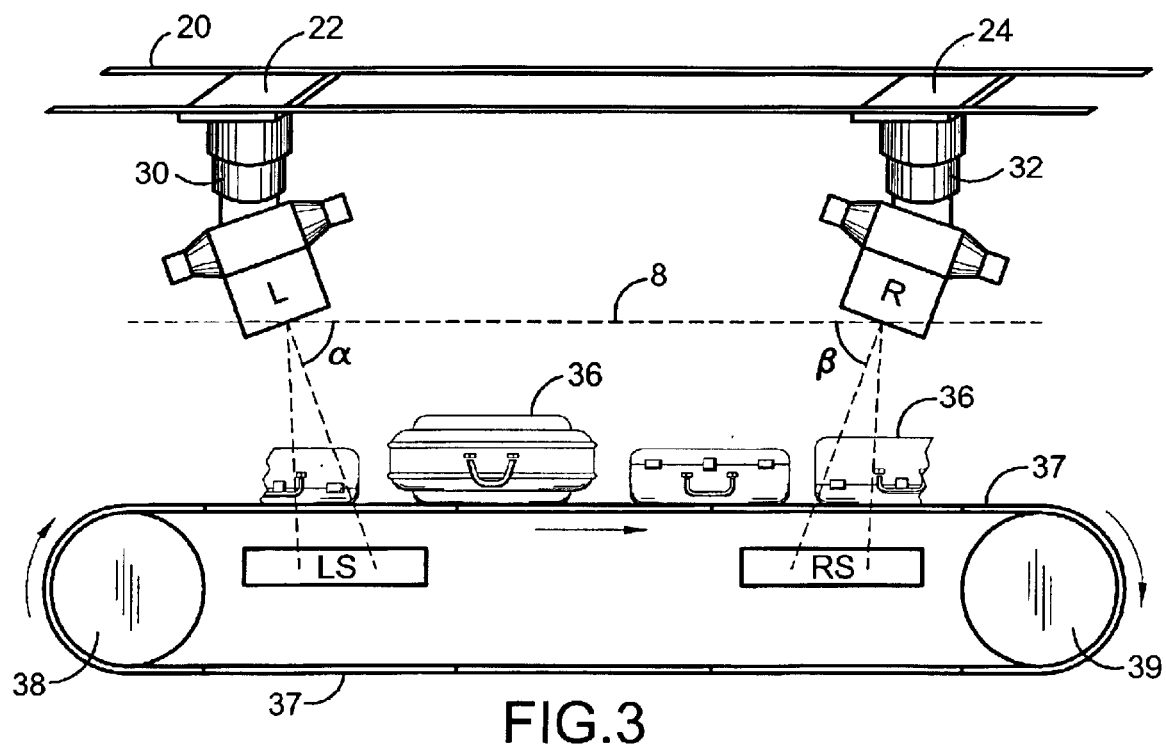
FIG. 3 is a diagrammatic view illustrating a scanning system including left and right X-ray sources so disposed that their stereo base is within the hyperstereo range.

A system utilizing the approach discussed in conjunction with FIG. 2 is shown in FIG. 3. Track 20 carries left X-ray source support 30 that supports X-ray source L through plate 22, and plate 24 supports X-ray source support 32 carrying X-ray tube R on the same track. For comparison with FIG. 2 common line 8 has been shown as a dashed line in FIG. 3. Likewise angles α and β have been included in FIG. 3 for the purpose of clarification. Thus, x-ray tube L is mounted to maintain the predetermined angle α, and X-ray tube R is oriented to emit a collimated X-ray beam at the derived angle β, both relative to the common line 8.

Referring now in general to the operation of the system, for the sake of clarity it has been assumed that the conveyor is moving from left to right. Clearly if it is viewed as moving from right to left, the right perspective angle would be established first, and the left angle would be derived. Articles 36, such as luggage, parts being manufactured, or other objects being scanned are transported by conveyor belt 37 driven in the usual manner by rollers 38 and 39 to transport the parcels through the collimated fan-shaped X-ray beams. Left sensor LS and right sensor RS are separately illuminated by the L and R X-ray sources respectively as the parcels pass between the X-ray sources and the left and right sensors. It remains to identify and combine the image data from the left and right sensors as explained in conjunction with FIG. 4.

Figure 4:
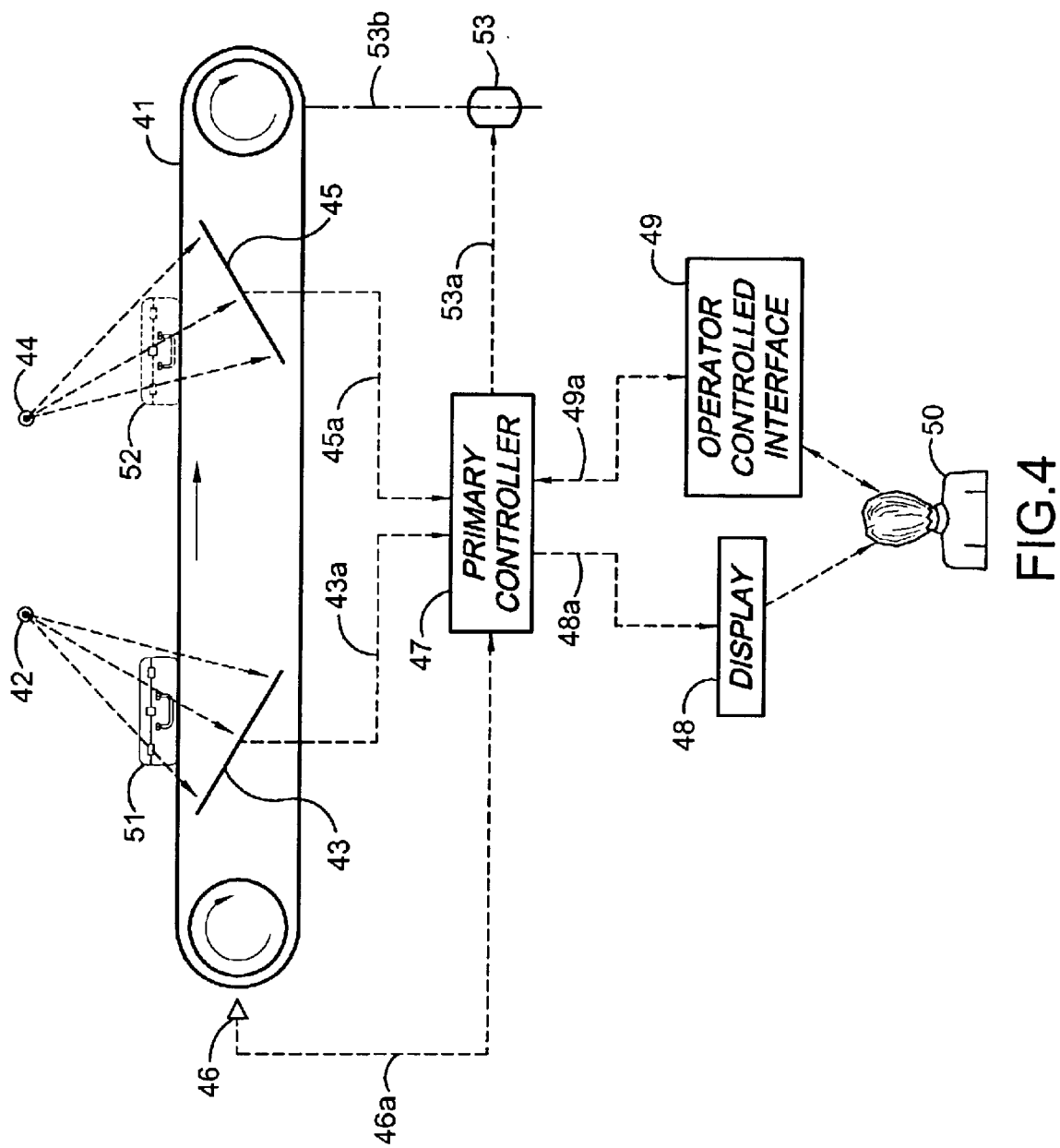
FIG. 4 is a block diagram illustrating certain functional components rendering the stereo scanning system operational.

In FIG. 4 conveyor 41 is similar to belts used on conventional luggage scanners except that the belt herein carries an encoded strip, preferably on its edge, bearing indicia for use in defining a coordinate, enabling a sensor 46 to read the position of the belt. A coordinate defined along the circumference of the belt is read by position sensor 46. A left X-ray source 42 and left image sensor 43 are positioned above and below the belt surface, respectively, at an angle necessary to meet the hyperstereo geometry constraints of the apparatus as previously discussed. A right X-Ray source 44 and sensor 45 are positioned at a location further down the belt away from left image sensor 43. The right X-ray source and sensor are similarly located above and below the belt at the negative angle with respect to a normal to the belt surface. As explained hereinbefore, this geometry is required to achieve, without cross-interference, the formation of a 3D radiograph of objects placed on the belt. Position sensor 46 is placed adjacent to the belt so that the encoded strip provides a continuous reading of the belt's position. The belt position data from position sensor 46 are transmitted via path 46a to a primary controller 47. Primary controller 47 also receives X-ray radiographic image data from left sensor 43, and from right sensor 45 via data paths 43a and 45a, respectively. Primary controller 47 is also connected to an operator-controlled interface 49 via a data path 49a. Primary controller 47 is further connected via a data path 48a to a stereo-display device 48, which is observed by a human operator 50. In addition, primary controller 47 is connected to the servomotor drive mechanism 53 by 53a, allowing it to control via a data path 53b the roller and belt system 41. Functional control of all operational modes of the luggage scanner is under the control of the operator-controlled interface 49. The human-machine interface consists of this operator-controlled interface 49, and the stereo-display device 48. Various operating modes can be initiated by human operator 50, using the operator-controlled interface 49. Examples of such modes are: the primary operating mode; the initialization mode; and the service mode all of which will now be described.

In the primary operating mode, luggage placed on moving belt 41 will usually move without slipping on the belt's surface. The left and right source and sensor pairs will send a sequential set of images to primary controller 47. At the same time belt position sensor 46 readings, which will correspond to the belt's position, will be used to tag the left and right sensed data with the corresponding belt coordinate of a point appearing in the center-of-view of each sensor. Since the centers-of-view of image sensors 43 and 45 are fixed with respect to each other, and with respect to the belt position sensed by sensor 46, the center of view measurements are readily derived from the belt position sensor data. The left sensor image data, along with the center-of-view measurement in belt coordinates, is stored in a sequential data structure in primary controller 47. Similarly, the right sensor image data is stored for the right eye in a separate sequential data structure along with its center-of-view measurement. When a piece of luggage 51 placed on the moving belt traverses between the left X-ray source 42 and left sensor 43 as shown in the FIG. 4, the radiographic image of the luggage along with the coordinate measurement of the centers-of-view in the belt's reference frame are stored by primary controller 47. The luggage then traverses the distance to the right X-ray source 44 and right image sensor 45 and a second image for the right eye is made of the luggage piece as it passes into the field of view of the right system as shown at 52 in FIG. 4. The right X-ray image data is stored, along with the coordinate measurement or reference frame on belt 41, in primary controller 47. Since the luggage rarely moves without sliding the coordinate measurement of a piece of luggage shown in position as 52 above right sensor 45, and the measurement at the left sensor in position as 51 will be the same. By using the coordinate measurement, primary controller 47 thus provides the stereo display device 48 with a left and right image for each eye as previously discussed. This process runs continuously while the belt is in motion. Since all image frame data is tagged with the coordinate measurement, individual pieces of luggage need not be sensed as a continuous process. In this embodiment the stereo pairs are viewed by an operator on a display device 48 in the form of a monitor. Various other viewing methods are available as will be described hereinafter. Based on the operator's observations commands can be issued, for instance via 53a, and the operator's control interface panel 49 to adjust or change the belt speed, or to stop and reverse the image stream. The operator can also place the machine in other control modes.

Turning now to the initialization mode, this mode is used to prepare the machine for use and to customize the machine for the unique physiological characteristics of each operator. Since stereo vision depends not only on two eyes but on the role played by the brain, the ability to merge two perspectives into a single 3D image differs from individual to individual. The primary function of the initialization mode, then, is to provide adjustments of off-sets from the nominal hyperstereo geometry to allow for an optimized condition for each operator. The initialization mode also allows the setting of operator passwords. Upon powering up the system, or on changing operators, the initialization mode will be invoked so that a positive identification of a certified operator can be made, and so that the proper operator-specific parameters can be set.

The third mode is the service mode. This mode provides for routine and diagnostic testing of the apparatus to insure proper operation and to perform preventive and corrective maintenance of all subsystems.

Other Embodiments

In the specific embodiment illustrated a monitor and primary controller were used for viewing a stereo pair. It is to be understood, however, that various means are available which enable the brain to merge the two perspectives into one true 3D image. Such means are widely available. Hence, except that they are essential for viewing, they are not a part of this invention per se. Examples of such means are devices which actually produce the image by themselves, glasses which merely influence the way the user sees the image on a standard monitor, and special stereo-3D software. Considering these three means in greater detail, examples of devices which actually produce an image by themselves are VR-helmets and head mounted devices. These devices are basically wearable monitors. To allow stereoscopic vision there is a little LCD or CRT monitor for each eye. Consumer products like VFX-1, i-glasses or Cybermaxx have two LCD monitors with an effective resolution of about 263×240 pixels each. In addition some of these helmets have a head tracker which replaces or complements keyboard, mouse or joystick input by head-movement. The hard and software compatibility of these devices is good, since they do not need special graphics-modes or driver software for stereoscopic vision, but they do require drivers for head tracking.

Examples of glasses which just influence the way an image is seen on a standard monitor are liquid crystal Shutterglasses and Shutter-Screens with polarization glasses. Shutterglasses and Shutter-Screens are used in conjunction with a normal cathode-ray-tube-monitor or projector. The two images required for stereoscopic vision are displayed on the standard monitor in turns. For a fraction of a second the image dedicated to the left eye is displayed, after that the image for the right eye appears for the same duration of time and so on. The job of the glasses is to prevent the left eye from seeing the image dedicated to the right eye and vice versa. To do this the light is blocked by an LCD-"Shutter". This can be accomplished in two ways. One way is to place the shutter on the monitor and watch it through passive, non-electronic, polarization glasses. The other way is to build the shutters into the glasses. The highest software compatibility is achieved by using a VGA-pass-through controller. These controllers are installed between the graphics-board and the monitor. There are several graphics boards with integrated glasses controllers. Other shutterglasses are linked to the software. It can thus be seen that various alternatives are available for viewing the stereo pairs produced by this invention.

Figure 5:
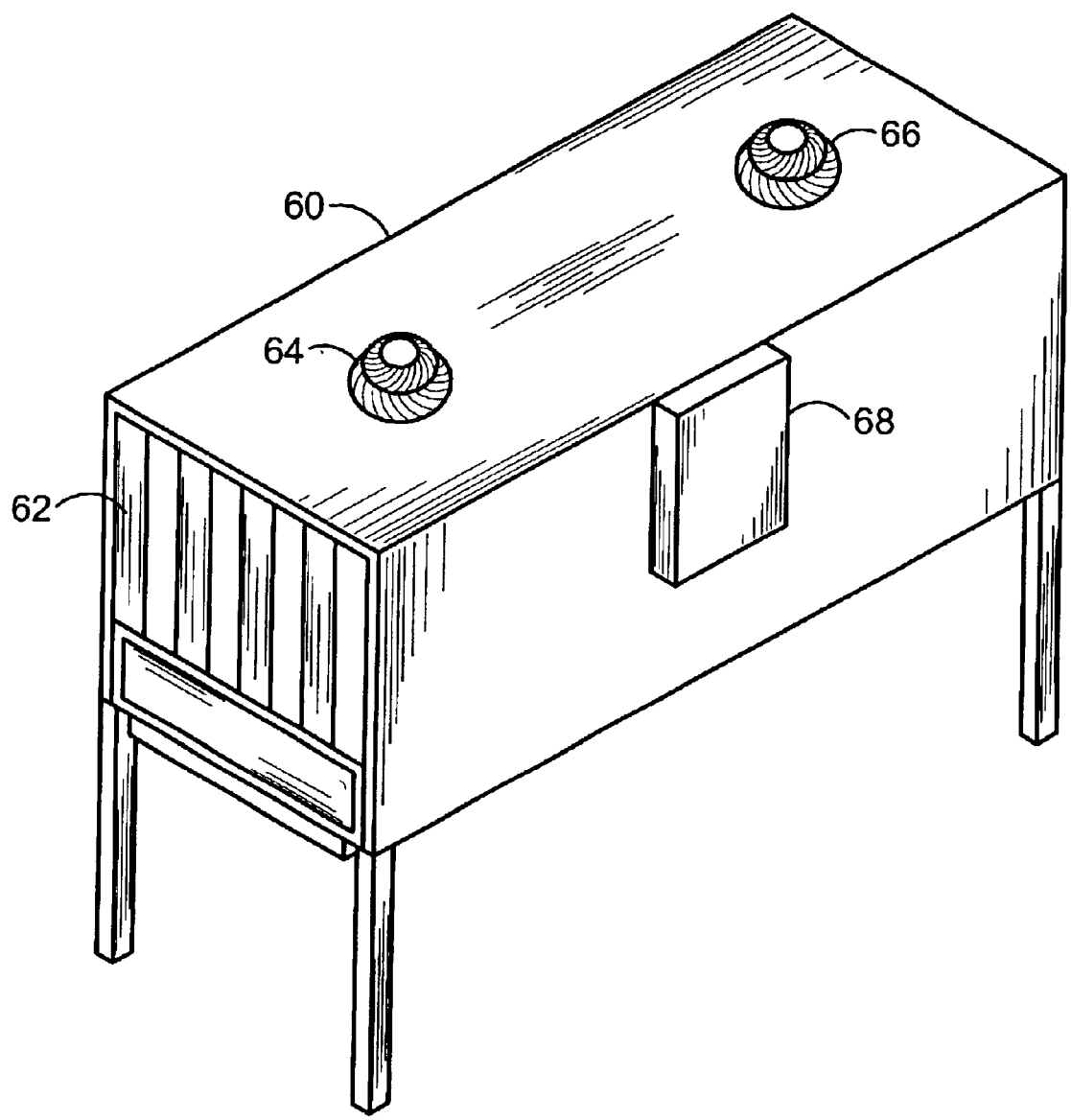
FIG. 5 is an isometric view of an exemplary embodiment of a stereoscopic scanning device of the invention.

In the light of the foregoing description of the invention modifications will occur to those in the art. As an example it can be seen that in addition to luggage the invention can be used for detecting contraband in schools, government building security, airport hand parcels, industrial processing applications, and even in hospitals. As another modification, to insure that the luggage does not slide, the conveyor belt can be provided with ribs, ridges, or dividers and the like. In addition, whereas the sensors are shown within the conveyor belt in FIG. 3 the X-ray beam angles can be adjusted so that the sensors can be placed at each end of the conveyor so that the conveyor will not receive X-ray radiation. As still another variation, one structural form the invention is illustrated in FIG. 5. In that figure a housing 60 is provided in the form of a tunnel having a curtain 62 in the form of straps, and turrets 64 and 66 housing X-ray source supports 30 and 32. Housing 68 serves as an enclosure for the electronics described in conjunction with FIG. 4. Clearly the invention can be incorporated in any structure, or even in an open setup rather than the housing structure depicted in FIG. 5. Such ramifications and modifications are deemed to be within the scope of this invention.

What is claimed is:

1. An X-ray-based imaging system providing stereoscopic three-dimensional images of objects moving from left to right in a path beneath two X-ray emitting tubes, the system including: left and right X-ray tubes aligned on a common line in the same plane above the path; left and right X-ray sensors disposed below the path in alignment with the X-ray tubes to sense X-rays emitted by the tubes; a left X-ray tube support adapted to constrain the left X-ray tube in a position a known distance from a target and at a known perspective, the perspective being an angle formed by the common line and a line to the target, permitting the left X-ray tube to emit a collimated X-ray beam at an angle which is a left viewpoint; computing means for determining a right perspective angle, using the distance from the left X-ray tube to the target, the distance from the left X-ray tube to an imaginary point, and the distance from the imaginary point to the target, the imaginary point being a point which is within the stereoscopic range on the common line between the tubes, the determined right perspective angle being a right viewpoint from a slightly different perspective leading to a stereo pair; a right X-ray tube support adapted to retain the right X-ray tube on the common line in its angular orientation to retain its determined right perspective angle, but spaced away from the left X-ray tube an actual distance or stereo base greater than normal stereo base to eliminate cross exposure interference while still obtaining X-ray exposures from two slightly different perspectives; means operating the X-ray sources continuously; a discriminator adapted to sample radiographic images sensed by the left sensor and to distinguish separate objects passing over the sensor; a processor adapted to store separately radiographic data for each object sensed by the left sensor; an encoder adapted to sense conveyor positions of each object, to match the stored radiographic data from the left sensor with corresponding radiographic data sensed by the right sensor, and to combine the matched left and right radiographic data to form the stereo pair for three-dimensional viewing.

2. The X-ray-based imaging system of claim 1 wherein the discriminator includes a conveyor belt carrying an encoded strip bearing indicia for use in defining a coordinate in the belt's reference frame, a position sensor adapted to read the coordinate, and an encoder adapted to derive a belt position from the coordinate.

3. The X-ray-based imaging system of claim 2 wherein the processor is a primary controller adapted to store right and left sensed radiographic image data along with the coordinate, and to provide a stereo pair for a viewing means.

4. The X-ray-based imaging system of claim 3 wherein the viewing means is a device which produces the stereo image by itself.

5. The X-ray-based imaging system of claim 3 wherein the viewing means is a pair of glasses which influences the way a user sees the image.

6. The X-ray-based imaging system of claim 3 wherein the viewing means is a standard monitor along with special stereo-3D software.

* * * * *